US008453126B1

(12) United States Patent
Ganelin

(10) Patent No.: US 8,453,126 B1
(45) Date of Patent: May 28, 2013

(54) SYSTEM AND METHOD FOR CONVERTING BASE SAS RUNTIME MACRO LANGUAGE SCRIPTS TO JAVA TARGET LANGUAGE

(75) Inventor: Pavel Ganelin, Rockville, MD (US)

(73) Assignee: Dulles Research LLC, Reston, VA (US)

( * ) Notice: Subject to any disclaimer, the term of this patent is extended or adjusted under 35 U.S.C. 154(b) by 846 days.

(21) Appl. No.: 12/512,983

(22) Filed: Jul. 30, 2009

Related U.S. Application Data

(60) Provisional application No. 61/084,996, filed on Jul. 30, 2008.

(51) Int. Cl.
*G06F 9/45* (2006.01)

(52) U.S. Cl.
USPC ........... 717/136; 717/143; 717/144; 717/146; 717/147; 717/148

(58) Field of Classification Search
None
See application file for complete search history.

(56) References Cited

U.S. PATENT DOCUMENTS

| | | | | |
|---|---|---|---|---|
| 6,330,709 | B1* | 12/2001 | Johnson et al. | 717/100 |
| 7,110,936 | B2* | 9/2006 | Hiew et al. | 703/22 |
| 8,015,543 | B1* | 9/2011 | Carrick et al. | 717/106 |
| 8,060,857 | B2* | 11/2011 | Biggerstaff | 717/106 |
| 8,214,795 | B2* | 7/2012 | Cheriton | 717/104 |
| 2002/0161907 | A1* | 10/2002 | Moon | 709/230 |
| 2002/0184401 | A1* | 12/2002 | Kadel et al. | 709/315 |
| 2005/0273772 | A1* | 12/2005 | Matsakis et al. | 717/136 |
| 2005/0289524 | A1* | 12/2005 | McGinnes | 717/140 |
| 2006/0080341 | A1* | 4/2006 | Graham | 707/100 |
| 2006/0123385 | A1* | 6/2006 | Medvedev et al. | 717/100 |
| 2006/0182418 | A1* | 8/2006 | Yamagata et al. | 386/95 |
| 2006/0265508 | A1* | 11/2006 | Angel et al. | 709/230 |
| 2008/0059960 | A1* | 3/2008 | Akiyoshi | 717/170 |
| 2008/0222616 | A1* | 9/2008 | Cheng et al. | 717/137 |
| 2009/0132070 | A1* | 5/2009 | Ebrom et al. | 700/90 |
| 2009/0222799 | A1* | 9/2009 | Stewart et al. | 717/143 |
| 2009/0241094 | A1* | 9/2009 | Sikka et al. | 717/127 |
| 2009/0276753 | A1* | 11/2009 | Bouillet et al. | 717/105 |
| 2012/0005650 | A1* | 1/2012 | Carrick et al. | 717/106 |

OTHER PUBLICATIONS

Title: An architecture model for dynamically converting components into Web services, author: Lee, R et al, source: IEEE, dated: 2004 source: IEEE.*
Title: Macro-based hardware compilation of JavaTM bytecodes into a dynamic reconfigurable computing system, Cardoso, J.M.P. et al, source: IEEE, dated: 1999.*

* cited by examiner

*Primary Examiner* — Chameli Das
(74) *Attorney, Agent, or Firm* — Whitham, Curtis, Christofferson & Cook, P.C.

(57) ABSTRACT

A system and method for automated conversion of a SAS runtime macro language (RML) program to a target language program such as JAVA. RML macros are identified and converted for inclusion in the RML program. A lexer is applied to generate a stream of tokens, including a token type for ambiguous tokens. A context dependent parsing module, including a token filter to resolve ambiguous tokens, assists the parser in generating an abstract syntax tree (AST), which is modified to express RML specific control flow constructs with target language program elements. The elements of the modified AST are replaced with target language templates from a library, with template parameters filled from the corresponding AST element. A run time library is provided for execution of the target language program.

20 Claims, 3 Drawing Sheets

SYSTEM AND METHOD FOR CONVERTING BASE SAS RUNTIME MACRO LANGUAGE SCRIPTS TO JAVA TARGET LANGUAGE

RELATED APPLICATION

This application claims priority from U.S. Provisional Application Ser. No. 61/084,996 having the same title and filed on Jul. 30, 2008.

BACKGROUND OF THE INVENTION

1. Field of the Invention

The present invention generally relates to techniques for conversion of applications implemented in accordance with a particular set of rules and syntax to another set of rules and syntax, and more particularly to the conversion of such applications written in a script language to a target language such as JAVA.

2. Background Description

The process of converting from one language to another is similar to compiling a program. The difference is that instead of generating machine code (or, more recently, byte code as in Java and C++) the converter generates output in a high-level language. Conversion consists of the following steps:

1 Language parsing and syntax tree building.
2 Syntax tree analysis. For traditional compilers this step usually includes machine-independent optimization. For language conversion this step may include modifying the tree to more closely match the target language and type assignment.
3 Code generation; i.e., producing actual output in the target language.
4 Run-time support library to implement.

In the case of compilation, no actual person is expected to be able to read or modify the generated code, so the readability or maintainability of the generated code is not important. For language conversion, on the other hand, it is expected that the generated code will be read and modified later, during code maintenance. Thus the main additional requirement is readability of the generated code.

Language conversion is not always straightforward, and may in some instances it may be very difficult if not impossible to provide a fully automated conversion that retains the functionality of the source language, including the requirements of readability and maintainability. This is most obvious with natural spoken and written languages, where aspects of the grammar and syntax of the source languages may be unique and therefore not available in the target language. Natural languages pose additional difficulties because the rules governing language constructions are not always consistent.

Computer language conversion may face similar difficulties, although the computer implementation environment requires a greater level of rule consistency than is tolerable for natural languages. On the other hand—also because of the demands of the computer implementation environment—the representation in the target language must be fully compliant with the rules, grammar and syntax of the target language. Thus, if the target language does not contain structures that correspond to each of the structures of the source language a fully automated conversion may be difficult or even impossible.

Base SAS® (a runtime macro language as hereinafter defined, hereafter "SAS" or "Base SAS") is a proprietary software product sold under the registered trademark SAS® and owned by the SAS Institute Inc. It is widely used in the financial industry and elsewhere to organize and analyze data. It is marketed as a fourth-generation programming language (4GL) specially designed for data access, transformation and reporting. SAS provides support for Structured Query Language (SQL). Its language supports a "DATA step" for creating SAS dataset from various types of source files. Its language supports software procedures ("PROCs"), computer routines performing predefined data analysis, manipulation, and reporting functions. SAS programs are scripts which are interpreted and executed by Base SAS.

The task of converting scripts written in SAS into another language is problematic because these scripts embody features of the SAS Base language that are not readily convertible to a target language, at least not by conventional or prior art techniques, without significant manual reprogramming. Thus, it is not feasible within the prior art to execute SAS scripts except within a Base SAS computing environment. What is needed is an automated methodology and system for converting SAS scripts so that they may be executed within a computing environment other than Base SAS.

For the purposes of the present invention, the computing environment for addressing this market need is the JAVA environment. This environment includes JDBC layer, an implementation of the application program interface (API) for the JAVA programming language that defines how a client may access a database, and H2, the JAVA SQL database. JDBC is oriented toward relational databases (RDB) which are serviced by relational database management systems (RDBMS). The combination of techniques comprising the invention yield the desired result JAVA programs that operate in the JAVA computing environment the same way as SAS scripts operate in the Base SAS environment. The inventors of the present invention make no claim that the same combination of techniques will achieve similar results in a computing environment other than JAVA or with respect to a language conversion from programs not written in Base SAS.

JAVA is very rich in its set of features and language constructions, so it is possible to map almost all SAS constructions to some natural JAVA equivalent. What is needed, however, is a methodology and system for handling those features of scripts written in Base SAS that do not appear to be convertible.

SUMMARY OF THE INVENTION

It is therefore an object of the present invention to provide a system and method for automatically converting script written in Base SAS to JAVA.

It is also an object of the invention to provide a conversion that does not require post-conversion editing or other manual intervention.

Yet another object of the invention is to overcome the incidence and impact of errors and time delay from manual conversion of SAS programs.

A further object of the invention is to reduce costs for legacy SAS code maintenance and support via conversion to a broadly supported language.

The name given to the invention as implemented so as to accomplish the foregoing objectives in an operable system is "Carolina".

An aspect of the invention is a method for converting a SAS readable program to a JAVA readable program, by lexing and parsing. In the lexical phase the SAS readable program is analyzed into a stream of tokens, where one or more of the tokens are ambiguous. The stream of tokens are parsed to generate an abstract syntax tree (AST), using a context dependent parsing module adapted to SAS to resolve the ambiguous tokens. The AST is processed to identify JAVA objects and identify SAS specific constructs affecting program control. The AST is modified to express the control flow provided by SAS specific constructs in terms of JAVA program elements. The elements of the modified AST are traversed and matched to corresponding templates of JAVA code from a template library, and template parameters are filled from the corresponding elements, with the resulting code being put in an output file of a JAVA readable program.

In another aspect the invention provides a filter to identify SAS macros and replace the macros with corresponding SAS code in the SAS readable program. The context dependent parsing module includes a token filter to resolve ambiguous tokens and is adapted to resolve keywords that are not reserved, ambiguous language constructions, and Base SAS options that don't follow a pattern and that are not describable in Backus-Naur form.

Another aspect of the invention modifies a deterministic finite automaton (DFA) lexer to add an ambiguous token type used where the DFA lexer cannot determine a token type. Further, a part of the context dependent parsing module is a filter that is applied to the token stream to resolve keyword ambiguities and other ambiguous constructions by transformations that remove a token from the stream, change a type of a token, split a token into multiple tokens, merge tokens, and change the relative order of tokens. Lookup tables are created to resolve statement options by statement name, current statement, and option name. The modified AST is created by mapping SAS types to JAVA types, converting LINK statements to method calls, and by removing GOTO statements.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
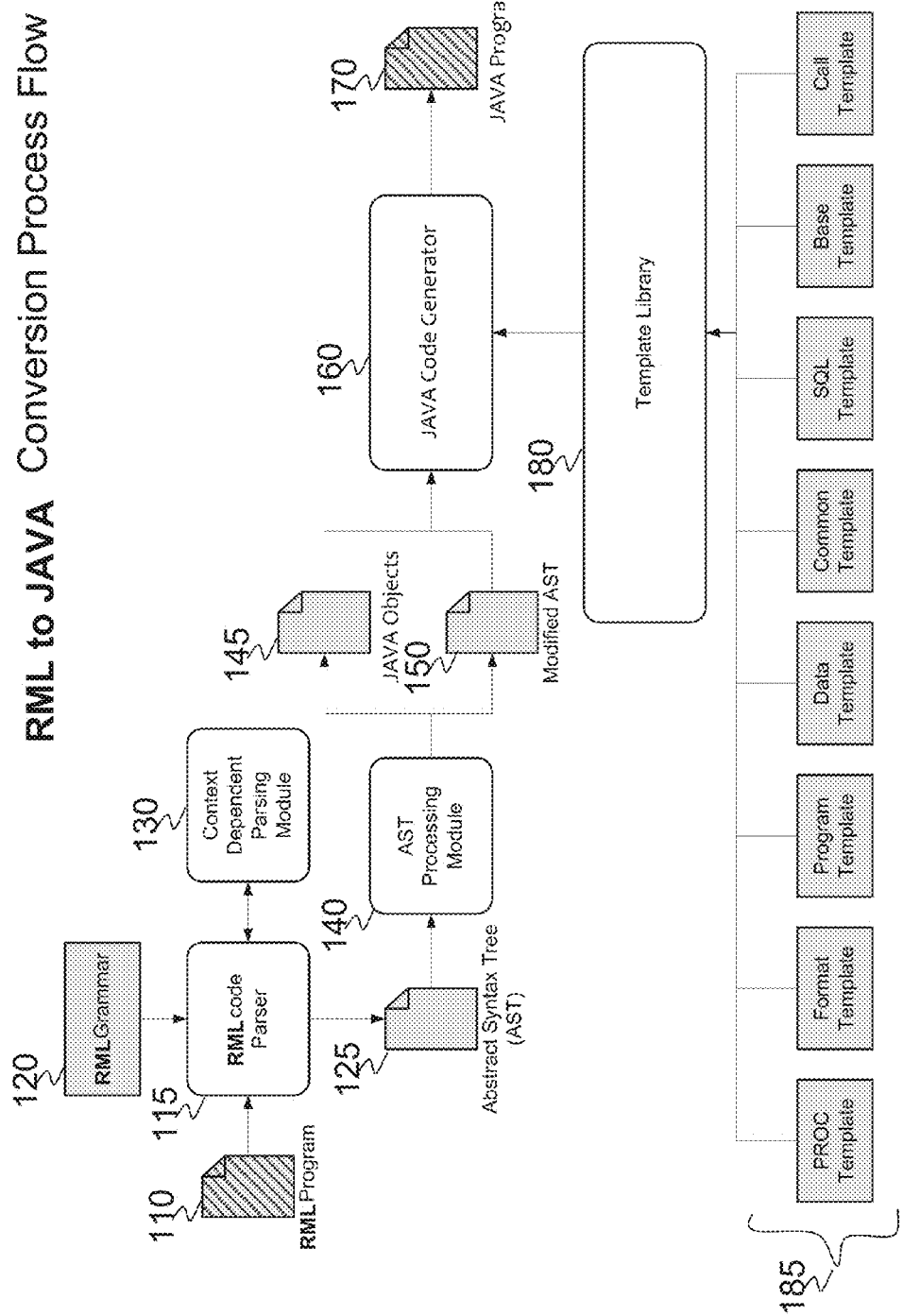
FIG. 1 is a flow diagram of the SAS to JAVA conversion process.

Computer language translation involves two separate steps. The first step breaks up an input stream of characters into a stream of vocabulary symbols (also called tokens or lexemes) for use by a parser. The software performing this step is often called the lexer or scanner. The second step takes the resulting token stream and builds an abstract syntax tree representing the program. The latter step is performed by a parser.

In modern computer languages, lexer and parser are two well defined steps. DFA (deterministic finite automata)-based lexers are sufficient for the first step. The program (part of the compiler/interpreter) that parses the source code of a context-free language can be automated using traditional parser generators such as YACC ("Yet Another Compiler Compiler"), which was written in C programming language, or some of its derivatives (e.g., bison), or more modern parser generators such as ANTLR ("Another Tool for Language Recognition") or JAVA C ("JAVA Compiler Compiler").

However, Base SAS as a language has features which distinguish it from modern languages (such as JAVA or C++) and which make parsing of the language very difficult. The well defined and sequential lexing and parsing steps that work for conventional computer languages do not work for SAS. The following are some of the inherent SAS language problems:

No reserved keywords.
The language is ambiguous; i.e., interpretation of language statements depends upon previous statements.
It cannot be described by context-free grammar or Backus-Naur form (BNF).
Embedded constructions such as X statements.
Advanced macro language and its interaction with runtime execution.
Context sensitive lexing.

These difficulties with the SAS language will be summarized below.

Keywords are not Reserved

The Base SAS language allows the use of any name as an identifier, including words that in other places have a specific semantic meaning. In this respect it is similar to the PL/1 language and, as with the latter, it allows constructions such as this famous example:

if then=else then else=if else then=if;

The first "then" is a variable. The second "then" is a keyword indicating the then clause of the if statement. We describe below the technique we use to resolve which tokens are keywords and which are variable names.

Ambiguous Constructions

Here are listed some examples of ambiguous language constructions:

Example 1
Input +1;
Interpretations:
1 increment variable named input by one, or
2 in the input buffer, move to the next column.
If there is no variable named "Input", SAS chooses the second meaning.

Example 2
ARRAY NOT(2); *describes an array of two elements
A=not(2);
Interpretations:
1 apply logical operation not to number 2
2 takes the second element of array not.

Lack of Context-Free Grammar to Describe the Language

Many Base SAS options allow further options. These options do not follow any regular pattern and can not be described using BNF.

Embedded Constructions

The SAS X statement allows operating system commands to be written within the SAS program for execution during program interpretation.

Interaction of MACRO Language with Run-Time Execution.

Base SAS does not allow:
1. user defined functions or subroutines.
2. conditional logic or loops across multiple DATA steps and PROCs.
3. sharing variables across DATA steps or PROCs.

To solve these problems, SAS introduced a macro language. Compared with C/C++, the macro language SAS MACRO has a unique feature: it can interact with SAS runtime. By using this feature (or, more appropriately, misusing it) it is possible to write a program where the generated code depends on the input data. In this application the term "runtime macro language" or "RML" will be used to refer to a language having this macro feature and "runtime macro language scripts" or "RML scripts" or "RML readable programs" will be used to refer to programs written in RML.

Example
```
DATA_NULL_;
INFILE 'PROGRAM.TXT';
INPUT CODE $;
CALL SYMPUT ('CODE',CODE);
RUN;
DATA_NULL_;
X=&CODE;
PUT X=;
RUN;
```
The file PROGRAM.TXT consists of the single line:
1+2+9;

The result of executing the second DATA step would be to assign twelve to the program variable X. This type of program is impossible to convert into JAVA (or any other language, for the same reason) because the code to be executed is not known at the moment of compilation.

Context-Sensitive Lexing

Example 1

Let's compare two statements.
DATA date9.a;
and
INPUT a date9.b;

In the first statement, "date9" and the dot (".") are two separate tokens. Date9 stands for the library name and the dot separates the library name from the dataset name. In the second statement "date9." is a single token indicating the SAS format used to input variable "a". A DFA based lexer can not distinguish between these two cases.

Example 2 put (K-L, DATE9.-L)

The first L stands for a variable named L and means that we need to subtract L from K. The second L is actually a part of the token "-L" to indicate that the resulting value should be left-aligned.

In the detailed description that follows we describe our approach to solving these issues.

The general process flow of SAS to JAVA conversion is presented on FIG. 1. First, a SAS program 110 is processed by a SAS code Parser 115. The parser 115 utilizes an implementation of the SAS grammar 120 and outputs an Abstract Syntax Tree (AST) 125. Since SAS syntax can not be represented by a context independent grammar, SAS code parser 115 interacts with the Context Dependant Parsing Module 130 to resolve ambiguities.

The next step is to process 140 the AST itself and identify JAVA objects 145 that need to be defined in the final output JAVA program 170. In addition, SAS specific constructs, like LINK and GOTO are identified and AST 125 is modified 150 to express the control flow of the SAS program 110 with the elements of JAVA language.

Finally the modified AST 150 is used to generate 160 the output JAVA program 170. For each element of the modified AST 150 there is a corresponding template 185 in the Template Library 180. A template 185 is a skeleton JAVA code that implements an element of the modified AST 150. The JAVA Code Generator 160 traverses the modified AST 150, and for each element selects a template 185, fills it in with the corresponding parameters and places the resulting JAVA code into the output JAVA program file 170.

Figure 2:
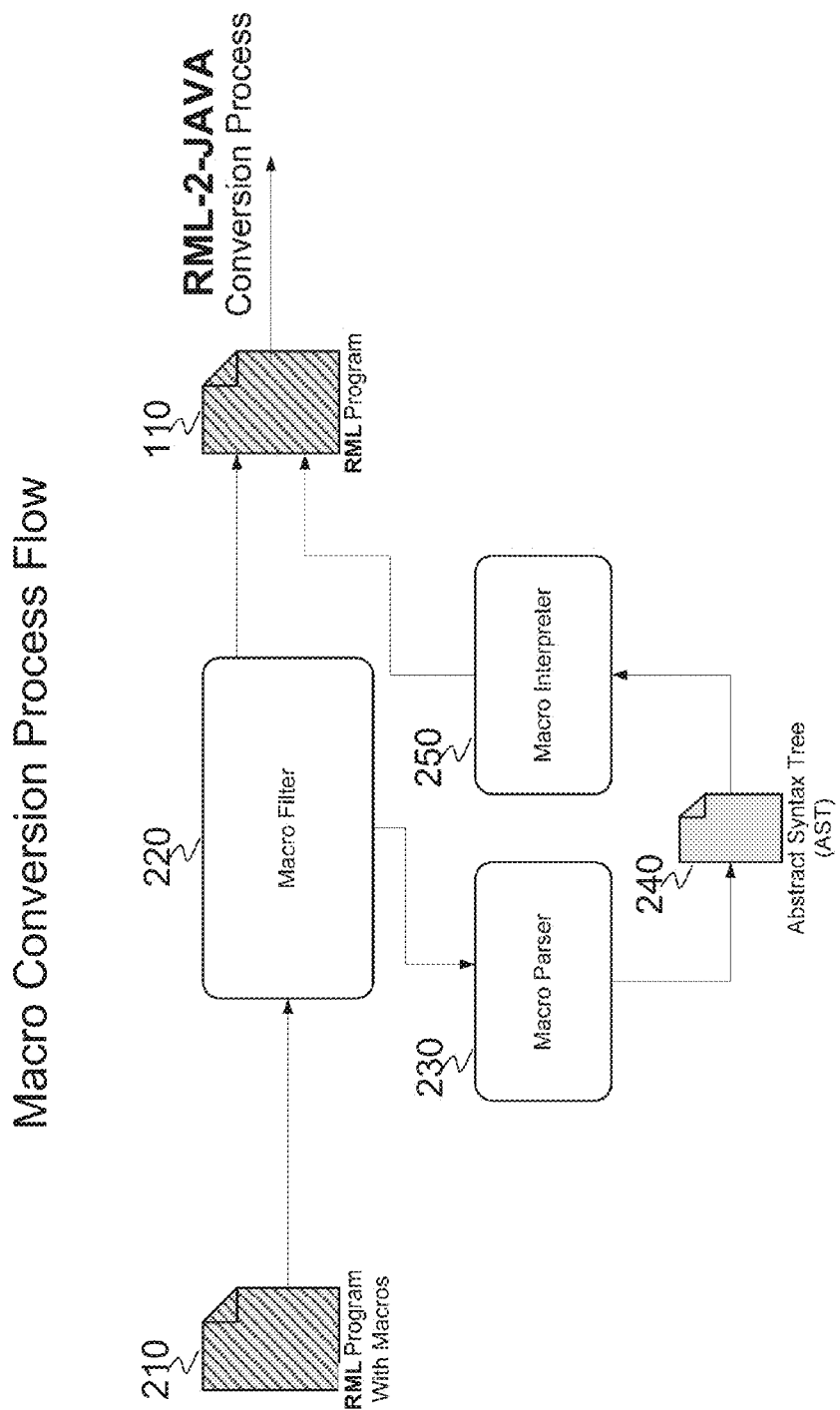
FIG. 2 is a flow diagram of the SAS macro conversion process.

Turning now to FIG. 2, if the original SAS program 210 contains SAS Macros, an additional pre-processing step is required before SAS-to-JAVA conversion can be accomplished. The original SAS program 210 is processed by a Macro Filter Module 220. If a Macro is detected it is first parsed by a specialized Macro Parser 230 into macro AST 240. Then the macro is executed by a Macro interpreter 250 and a corresponding SAS code is generated and added to the SAS program file 110. After that the output SAS program 110 is converted to JAVA as described above.

Figure 3:
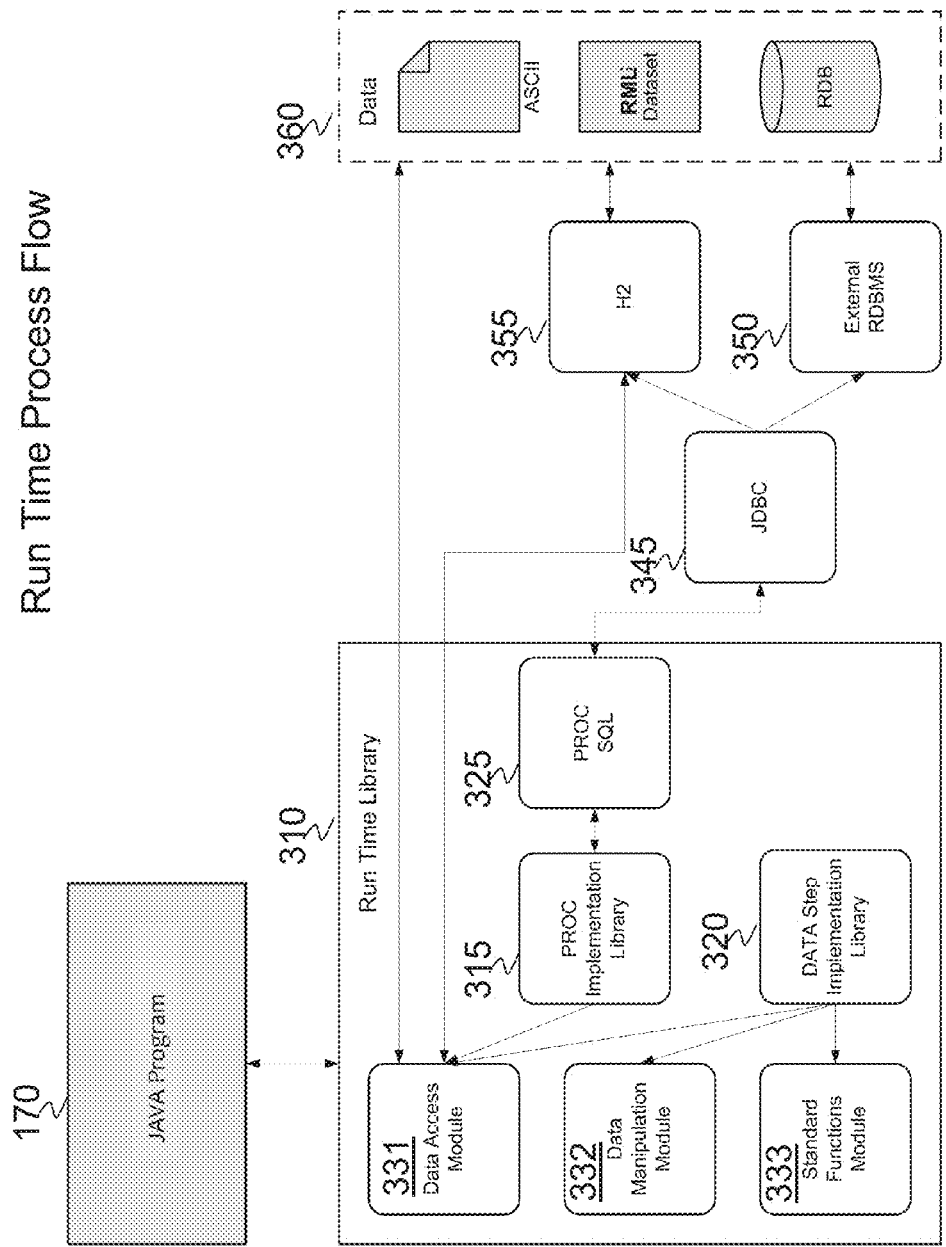
FIG. 3 is a flow diagram of the run time process for execution of the converted JAVA program.

During the execution of the converted SAS program by Carolina, a Run-Time library 310 is required as shown in FIG. 3. The Run-Time Library 310 contains JAVA classes that implement SAS PROCs as well as certain statements of the SAS Data Step 360. In turn, PROC Implementation Library 315 and DATA Step Implementation Library 320 both utilize lower level functionality of the Data Access 331, Data Manipulation 332 and Standard Function Module 333. PROC SQL 325 implementation contains specialized code that direct SQL statements through JDBC 345 either directly to the external RDBMS 350 or to the H2 database 355 that is used to implement SAS built-in data manipulation capabilities.

Lexing and Parsing

Lexer

The lexer is actually implemented in two steps. The first step resembles DFA based languages for JAVA or C++. In addition to the usual tokens, such as identifiers or numbers, we introduce a special token type: an ambiguous token where the lexer can not determine the token type. This token stream is then sent through a set of token filters.

Token Filters

A filter takes a raw stream of tokens created by the lexer and analyzes each one by looking at the surrounding tokens. The filter can remove tokens, change tokens types, split a token into multiple tokens, merge tokens, and change their relative order. Token filters use a set of heuristics to resolve keywords, and are included in Context Dependent Parsing Module 130.

Listed below are some of the transformations performed by these filters:

f1 Add special boundary tokens at the end of each DATA and PROC step.

f2 Some of the PROCs are not actually terminated by RUN statements but rather by QUIT statements. For such PROCs the filter removes intermediate RUN statements and replaces the QUIT statement with a RUN statement.

f3 Splits "numbered" tokens such as TITLE2 into a sequence of two tokens;
Before: TITLE2
After: TITLE 2.

f4 For Lag and Diff functions it also rearranges the set of tokens;
Before: LAG10 (x)
After: LAG (10, x)

f5 put function can accept an argument alignment put (x, 2.-L)

f6 Keyword recognition f7 Option recognition

SAS has a very irregular set of rules for statement options. For example:
so1 np—no parameter; i.e., Boolean option
so2 lines=3—takes integer parameters
so3 axis=1 to 3—takes from,to,by expression as parameters
so4 list=(1,2,3)—parenthesized list, comma separated
so5 list=1 2 3—list without parenthesis, space separated To distinguish different options, we create a large set of lookup tables. The resolution mechanism depends on the name of the PROC step (or DATA step), current statement and option name. With the guidance provided by this disclosure, these lookup tables may be created by one skilled in the art.

NOTE: In cases f3 and f4 the newly created tokens 2 and 10 are assigned a special type INT to distinguish between these statements TITLE 2; and TITLE2;

Parsing

The filtering process removes all irregularities from the original SAS language, and the resulting token stream can be described using context-free grammar. We use the ANTLR parser to build the syntax tree.

Base SAS is actually a combination of four languages in one (or five with the macro language)

DATA step
PROC FORMAT
PROC SQL
PROC, all other

Each of the languages is described by its own grammar file.

All of these grammars are derived from the common grammar that describes a set of elements shared between all grammars.

Java Code Generation

Tree Manipulation

After the pairing tree is built we need to perform the following tasks before we can start one-to-one mapping between syntax constructions:

Type assignment.
Convert LINK statements to method calls.
GOTO elimination.

Type Assignment

The JAVA language is a strongly typed language, i.e., each variable should be declared before its use with an explicit type specification. The SAS language allows variables to be created on demand, and the type is assigned based on the first use.

Below we list the mapping between SAS and JAVA types:

| SAS type | JAVA type |
| --- | --- |
| NUMERIC | double |
| CHARACTER | String |
| ARRAY NUMERIC | double[ ] (or multidimensional array) |
| ARRAY CHARACTER | String[ ] (or multidimensional array) |
| Input dataset (from set or merge statement) | InputDataSet * |
| Output dataset (from DATA statement) | OutputDataset * |
| SAS type | JAVA type |

SAS strings are fixed-size strings where the size of the string is determined during program compilation (or first use). JAVA does not have a fixed size string. Instead of creating JAVA class FixedSizeString to better represent a fixed size string we instead rely on JAVA strings.

To match SAS functionality, it would be necessary to expand or truncate a string variable every time a new value is assigned to the string variable, in order to fit the predetermined size. In many cases this operation is redundant and just leads to program slowdown, so Carolina ignores it.

Name Clash and Case Sensitivity.

SAS variable names and data set names are case insensitive. JAVA variables are case sensitive. When replacing case insensitive with case sensitive language we have three choices:

1 convert all variables to upper case;
2 convert all variables to lower case; or,
3 convert all variables to the same case based on the first occurrence.

For variable names we choose the third approach.

The SAS language has two levels of namespaces for an object: the local namespace at the level of the DATA step, which includes variable names and temporary arrays, and the three global namespaces for formats, library names and filenames. The same name can be used as a variable name, format name and library name without conflict.

In the resulting JAVA program we have the same two levels of namespaces. Global objects would be converted to data members of the main class. Variables and array names would be mapped to data members of anonymous classes There is a possibility of conflict where the symbol name at the DATA step level clashes with a global object. According to the JAVA rule, the name in the internal scope hides the name in the outer scope and it becomes inaccessible.

For the global variables the three namespaces are mapped to a single JAVA namespace and there is the possibility of a name clash; for example, a format having the same name as a library name.

To resolve this clash we use the following solution: format names are capitalized and filenames are converted to lower case. Then we analyze both global tables for possible name clash. If there is one, we try to change the capitalization to create a unique name.

Run-Time Library

The Carolina Run-time Library is an integral part of the Carolina run-time environment. It contains compiled JAVA code for the SAS DATA step implicit loop implementation. It also contains implementations for standard SAS statements that do not have natural counterparts in JAVA language such as SET, INFILE and many others.

Of course, this JAVA code could be generated anew each time Carolina converts a SAS program into JAVA. In that case there would be no need for an associated run-time library, inasmuch as all code including implicit loop implementation could be compiled and then executed. However, the drawback to this approach is two-fold: it a) mandates an overlarge amount of JAVA code to maintain, and b) imposes additional processing time in order to compile the generated JAVA code.

For these reasons, the standard Carolina approach and distribution includes a Run-time Library.

While the invention has been described in terms of a single preferred embodiment, those skilled in the art will recognize that the invention can be practiced with modification within the spirit and scope of foregoing objects.

Having thus described my invention, what I claim as new and desire to secure by Letters Patent is as follows:

1. A computer implemented method for converting a runtime macro language ("RML") readable program to a target language readable program, by lexing and parsing, comprising:

analyzing by the computer the RML readable program into a stream of tokens, one or more of the tokens being ambiguous;

parsing by the computer the stream of tokens to generate an abstract syntax tree (AST), using a context dependent parsing module adapted to RML to resolve the ambiguous tokens;

processing by the computer the AST to identify target language objects and identify RML specific constructs, each said RML specific construct affecting the control flow of the RML readable program;

modifying by the computer the AST to express the affected control flow of the RML readable program with target language program elements;

traversing by the computer the modified AST and for each element in the modified AST:

selecting a corresponding template of target language code from a template library;

filling the template with parameters corresponding to the element in the modified AST; and placing the filled target language code template into an output target language readable program.

2. The method of claim 1, further comprising:
filtering by the computer the RML readable program to identify RML macros; and
replacing by the computer each identified RML macro with corresponding RML code in the RML readable program, said corresponding RML code being added to the RML readable program before said analyzing step.

3. The method of claim 1, further comprising adapting by the computer the context dependent parsing module to resolve at least the following attributes of RML:
keywords that are not reserved;
ambiguous language constructions; and
RML options not following a pattern and not describable in Backus-Naur form.

4. The method of claim 3, wherein the step of analyzing further comprises:
applying a lexer that is a deterministic finite automaton (DFA), the DFA lexer being modified to add an ambiguous token type used where the DFA lexer cannot determine a token type.

5. The method of claim 4, wherein the context dependent parsing module further comprises filters for filtering the stream of tokens by looking at tokens surrounding each token in the stream, said filters performing one or more of the following transformations:
remove a token from the stream;
change a type of token;
split a token into multiple tokens;
merge tokens; and
change the relative order of tokens.

6. The method of claim 4, further comprising creating by the computer lookup tables to resolve statement options by statement name, current statement, and option name.

7. The method of claim 1, wherein the step of modifying the AST further comprises:
mapping RML types to target language types;
converting LINK statements to method calls; and
removing GOTO statements.

8. The method of claim 1, further comprising providing a target language run-time library for execution of the target language readable program.

9. A computer implemented system for converting a runtime macro language ("RML") readable program to a target language readable program, by lexing and parsing, the computer implemented system having a processor operable to execute software modules, comprising:
means for analyzing the RML readable program into a stream of tokens, one or more of the tokens being ambiguous;
means for parsing the stream of tokens to generate an abstract syntax tree (AST), using a context dependent parsing module adapted to RML to resolve the ambiguous tokens;
means for processing the AST to identify target language objects and identify RML specific constructs, each said RML specific construct affecting the control flow of the RML readable program;
means for modifying the AST to express the affected control flow of the RML readable program with target language program elements;
means for traversing the modified AST and for each element in the modified AST:
means for selecting a corresponding template of target language code from a template library;
means for filling the template with parameters corresponding to the element in the modified AST; and
means for placing the filled target language code template into an output target language readable program.

10. The system of claim 9, further comprising:
means for filtering the RML readable program to identify RML macros; and
means for replacing each identified RML macro with corresponding RML code in the RML readable program.

11. The system of claim 9, wherein the context dependent parsing module is adapted to resolve at least the following attributes of RML:
keywords that are not reserved;
ambiguous language constructions; and
RML options not following a pattern and not describable in Backus-Naur form.

12. The system of claim 11, wherein the means for analyzing further comprises:
means for applying a lexer that is a deterministic finite automaton (DFA), the DFA lexer being modified to add an ambiguous token type used where the DFA lexer cannot determine a token type.

13. The system of claim 12, wherein the context dependent parsing module further comprises filters for filtering the stream of tokens by looking at tokens surrounding each token in the stream, said filters performing one or more of the following transformations:
remove a token from the stream;
change a type of a token;
split a token into multiple tokens;
merge tokens; and
change the relative order of tokens.

14. The system of claim 12, further comprising means for creating lookup tables to resolve statement options by statement name, current statement, and option name.

15. The system of claim 9, wherein the means for modifying the AST further comprises:
means for mapping RML types to target language types;
means for converting LINK statements to method calls; and
means for removing GOTO statements.

16. The system of claim 9, further comprising a target language run-time library for execution of the target language readable program.

17. A computer implemented system for converting a runtime macro language ("RML") readable program to a target language readable program, by lexing and parsing, the computer implemented system having computer codes stored thereon and having a processor operable to execute the computer codes, comprising:
first computer code executable by the processor for analyzing the RML readable program into a stream of tokens, one or more of the tokens being ambiguous;
second computer code executable by the processor for parsing the stream of tokens to generate an abstract syntax tree (AST), using a context dependent parsing module adapted to RML to resolve the ambiguous tokens;
third computer code executable by the processor for processing the AST to identify target language objects and identify RML specific constructs, each said RML specific construct affecting the control flow of the RML readable program;
fourth computer code executable by the processor for modifying the AST to express the affected control flow of the RML readable program with target language program elements;

fifth computer code executable by the processor for traversing the modified AST and for each element in the modified AST:
sixth computer code for selecting a corresponding template of target language code from a template library;
seventh computer code filling the template with parameters corresponding to the element in the modified AST; and
eighth computer code for placing the filled target language code template into an output target language readable program.

18. The computer implemented system of claim 17, further comprising:
ninth computer code executable by the processor for filtering the RML readable program to identify RML macros; and
tenth computer code executable by the processor for replacing each identified RML macro with corresponding RML code in the RML readable program, said corresponding RML code being added to the RML readable program before said analyzing step.

19. The computer implemented system of claim 17, wherein said context dependent parsing module is adapted to resolve at least the following attributes of RML:
keywords that are not reserved;
ambiguous language constructions; and
RML options not following a pattern and not describable in Backus-Naur form.

20. The computer implemented system of claim 17, wherein said first computer code for analyzing further comprises:
twelfth code for applying a lexer that is a deterministic finite automaton (DFA), the DFA lexer being modified to add an ambiguous token type used where the DFA lexer cannot determine a token type.

* * * * *